(12) United States Patent
Westin

(10) Patent No.: US 11,225,162 B2
(45) Date of Patent: Jan. 18, 2022

(54) PROVIDING ON-DEMAND POWER CHARGING FOR ELECTRIC VEHICLES

(71) Applicant: Landis+Gyr Innovations, Inc., Alpharetta, GA (US)

(72) Inventor: Erik Westin, Nisswa, MN (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 159 days.

(21) Appl. No.: 16/582,888

(22) Filed: Sep. 25, 2019

(65) Prior Publication Data

US 2020/0101863 A1 Apr. 2, 2020

Related U.S. Application Data

(60) Provisional application No. 62/737,320, filed on Sep. 27, 2018.

(51) Int. Cl.
*B60L 53/66* (2019.01)
*B60L 53/68* (2019.01)
(Continued)

(52) U.S. Cl.
CPC .......... *B60L 53/665* (2019.02); *B60L 53/305* (2019.02); *B60L 53/51* (2019.02); *B60L 53/63* (2019.02); *B60L 53/64* (2019.02); *B60L 53/68* (2019.02)

(58) Field of Classification Search
CPC .......... B60L 53/51; B60L 53/57; B60L 53/63; B60L 53/64; B60L 53/68; B60L 53/126;
(Continued)

(56) References Cited

U.S. PATENT DOCUMENTS

| 9,881,259 B2 | 1/2018 | Forbes, Jr. | |
| 2009/0177595 A1* | 7/2009 | Dunlap | B60L 55/00 705/412 |

(Continued)

FOREIGN PATENT DOCUMENTS

| CN | 107867186 A | 4/2018 |
| JP | 2012128587 A | 7/2012 |
| KR | 20110072531 A | 6/2011 |

OTHER PUBLICATIONS

International Search Report and Written Opinion, PCT Patent Application No. PCT/US2019/053030, dated Jan. 31, 2020, 11 pages.

*Primary Examiner* — Richard Isla
*Assistant Examiner* — Johali A Torres Ruiz
(74) *Attorney, Agent, or Firm* — Kilpatrick Townsend & Stockton LLP

(57) ABSTRACT

An on-demand power service provides electrical vehicle charging. Requesting the on-demand power service may include determining a current location of a computing device, determining an amount of power requested by a user of the computing device, and locating a plurality of mobile charging stations within a predefined geographic distance from the current location of the computing device. The method further includes receiving a price associated with each respective mobile charging station among the plurality of mobile charging stations, and providing on a display of the computing device, selectable options to purchase on-demand power from a mobile charging station among the plurality of mobile charging stations.

15 Claims, 3 Drawing Sheets

(51) Int. Cl.
  *B60L 53/51* (2019.01)
  *B60L 53/64* (2019.01)
  *B60L 53/30* (2019.01)
  *B60L 53/63* (2019.01)

(58) Field of Classification Search
  CPC ...... B60L 53/305; B60L 53/665; B60L 55/00;
    B60L 1/20; Y02T 90/12; Y02T 90/14;
    Y02T 90/16; Y02T 10/70; Y02T 10/7072;
    H02J 7/00032; Y02E 60/00; Y04S 10/126
  See application file for complete search history.

(56) References Cited

U.S. PATENT DOCUMENTS

| | | | |
|---|---|---|---|
| 2010/0000804 A1 | 1/2010 | Yeh | |
| 2010/0017249 A1 | 1/2010 | Fincham et al. | |
| 2011/0133693 A1 | 6/2011 | Lowenthal et al. | |
| 2012/0299531 A1* | 11/2012 | Prosser | B60L 53/57 320/104 |
| 2014/0088804 A1* | 3/2014 | Hyde | H02J 50/90 701/22 |
| 2016/0238633 A1* | 8/2016 | Parks | G06Q 50/06 |
| 2017/0138758 A1* | 5/2017 | Ricci | B60L 53/53 |
| 2017/0168493 A1* | 6/2017 | Miller | G01C 21/3682 |
| 2019/0001833 A1* | 1/2019 | Coburn | B60L 53/66 |
| 2019/0047427 A1* | 2/2019 | Pogorelik | G06Q 20/405 |
| 2019/0123578 A1* | 4/2019 | Zenner | H02J 7/14 |
| 2019/0172159 A1* | 6/2019 | Sun | G06Q 50/06 |
| 2019/0366831 A1* | 12/2019 | Cafeo | H02J 7/00045 |

\* cited by examiner

PROVIDING ON-DEMAND POWER CHARGING FOR ELECTRIC VEHICLES

RELATED APPLICATION

This application claims priority to U.S. Application No. 62/737,320, entitled On-Demand Power Service, filed Sep. 27, 2018, which is incorporated herein in its entirety by reference.

TECHNICAL FIELD

This application generally relates to electric vehicle charging, and more specifically to a system for charging that is flexible as to time and place.

BACKGROUND

There are presently a number of electric vehicles of the passenger type and the numbers and types of electric vehicles continues to increase. Almost universally, however, those vehicles are extremely inefficient, carry very heavy batteries, and at best have very limited range before the batteries need to be recharged. Significant research is being conducted throughout the world to develop new batteries which have much higher power per unit weight, and higher capacity, so as to allow faster and more long-ranging vehicles to be developed. However, there is still a need for facilities to recharge batteries of electric vehicles and/or hybrid vehicles. Of course, such charging stations must be capable of delivering charging power to the batteries safely, quickly, and economically. Additionally, with increased energy usage worldwide, public utilities are struggling to provide power during peak demand times.

SUMMARY

Aspects of the invention provide methods and systems for charging electric vehicles. In one aspect, a first electric vehicle may directly charge a second electric vehicle. The first electric vehicle receives electrical power from a source and stores it in a storage system. The source may be a solar panel attached to the vehicle, a charging station attached to the public grid, a charging station attached to a private grid, or an energy storage device. A first user may register or create an account to indicate that the first electric vehicle is available to charge other electric vehicles and may provide energy sale parameters that include price, location, type of source, and time. The price may be provided by the first user or a pricing model may be used to provide a price based on factors, such as time, weather, energy prices, and/or energy demand. A second user may request an amount of electrical power and may provide energy purchase parameters. The system may identify the first electric vehicle based on the energy sale and energy purchase parameters. In some situations, the first user and the second user may negotiate one or more terms of the transaction. Once the charging is complete, the system may facilitate payment from the second user to the first user. Other types of charging are also supported, including charging by connecting the first and second vehicle to a public grid, connecting the second vehicle to a private grid, or using a fixed or portable charging station.

The devices used by the first user and the second user may be fully or partially integrated into the first and second vehicles or may be separate from the vehicles. A central system may be included in or in communication with a headend system for a utility.

These illustrative examples are mentioned not to limit or define the disclosure, but to provide examples to aid understanding thereof. Additional examples are discussed in the Detailed Description, and further description is provided there.

BRIEF DESCRIPTION OF THE FIGURES

Various aspects and examples may be more completely understood in consideration of the following detailed description in connection with the accompanying drawings, in which.

DETAILED DESCRIPTION

Figure 1:
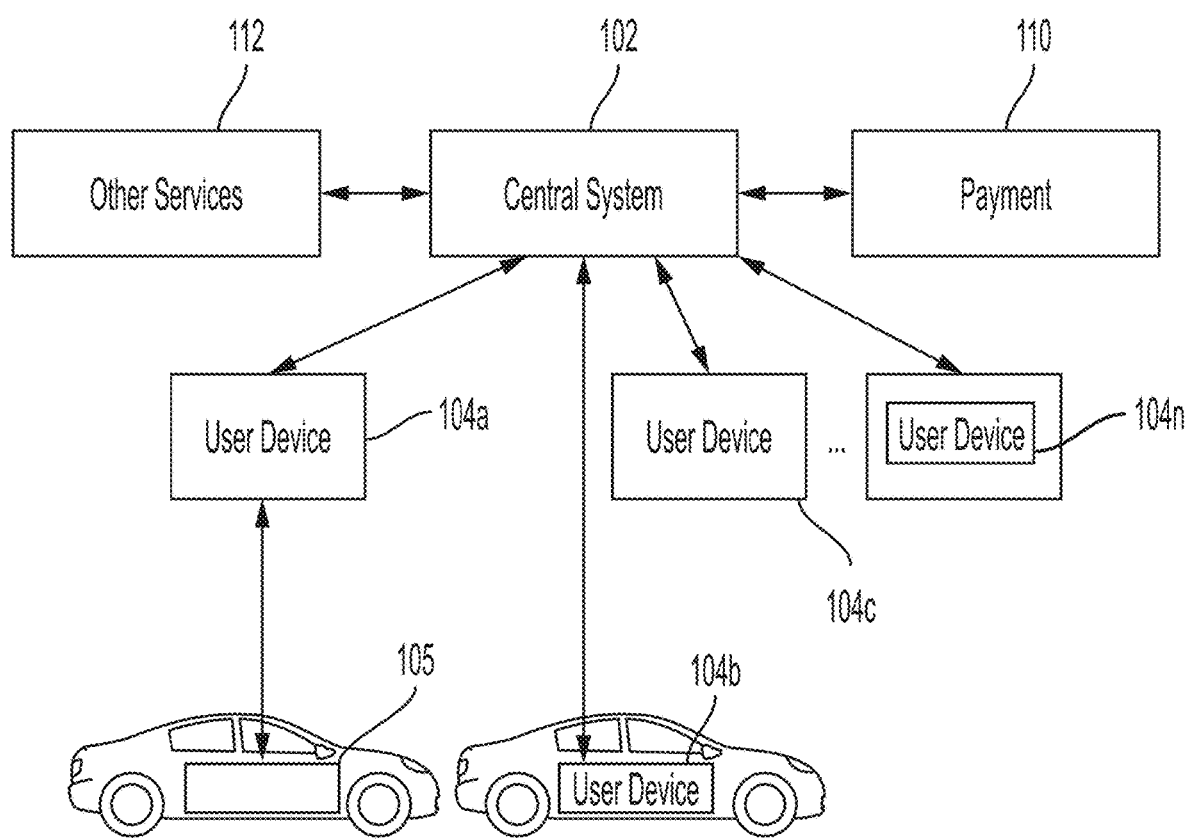
FIG. 1 is a block diagram illustrating an exemplary on-demand power system.

In accordance with examples of the present disclosure, an on-demand power service may be provided by an electric vehicle (EV). The on-demand power service may be in communication with a central system, such as a head end system of an electric power provider. Aspects of the on-demand power service may be integrated into a manufactured vehicle so all parts are confined and not exposed to the environmental elements. Further, the on-demand power service may use a modular apparatus that can be plugged directly into an electric vehicle receptacle, for charging electric vehicles for user-buyers.

With an on-demand power service device (e.g., a power meter installed in a vehicle), user-sellers have the ability to inject power into a power supply grid during peak demand hours, thereby alleviating some of the power supply shortages felt by public power utilities. With increased energy usage worldwide, public utilities are struggling to provide power during peak demand times. However, using the on-demand power system described herein, such utilities do not have to invest in expensive battery backup systems to provide consistent power during peak demand times because user-buyers can connect with user-sellers in an open forum, and negotiate prices and meeting locations. Moreover, user-buyers can obtain needed power from user-sellers without further draining the public power supply during peak usage times. In addition, large lithium ion power packs currently used by some utilities bring tremendous liability to a utility. In accordance with various example implementations, the on-demand power service may transfer solar and/or battery power from a device associated with one user to a device associated with another user, up to a threshold amount of power. Once the threshold is met, the on-demand power service may be terminated and the connection between the user-seller's device and the user-buyer's device may be terminated.

The on-demand power service described herein can calculate electrical value with a meter, such as may be integrated into and/or plugged into the vehicle of the user-seller. The calculated electrical value may be conveyed to the on-demand power service where it is quantified. User-buyers and user-sellers may access a user interface, such as that provided by a web-accessible or other type of software application, implementing the on-demand power service. The interface may allow the user-buyers and user-sellers to register an account, connect financial information such as banking information to their account, and interact with other users (e.g., other user-buyers and/or other user-sellers) to request on-demand power services and/or to provide on-demand power services. User-buyers can pay for on-demand power service at the time of the transaction, using the application. User-sellers can redeem payment from the application on a periodic basis, such as bi-monthly.

As an example illustration, a user-seller may have a portable charging station in their vehicle that is also coupled with a solar array. The solar array may provide power to the portable charging station during the daylight hours, such that the user-seller may provide on-demand power to user-buyers during the daylight hours. In this example illustration, the user-seller may have a 400 watt hour solar array that is capable of providing power for 6 hours during the daytime, for a cost of $0.08/kilowatt hour (kWh). This would approximate to roughly $2/day being deposited into the account of the user-seller.

In another example illustration, a user-seller having an electric vehicle may charge their vehicle overnight during off peak times and therefore pay off-peak rates such as $.12/kWh to charge a 100 kWh battery. The user-seller may subsequently sell the electricity from their electric vehicle during peak times and charge a higher rate during peak energy usage periods, such as $0.80/kWh. This markup and resale of energy by the user-seller reduces the amount of power which is drawn from the public utility provider during peak usage times, provides an on-demand source of power to the user-buyer at a point of convenience, and provides a return to the user-seller of approximately $60-$70/day for the resale of energy.

As a further illustration, user-sellers may charge a premium for on-demand power service during peak usage times or during other periods of high demand from user-buyers. For instance, a semi-truck trailer travelling on the interstate may sell 25 kWh of energy for $1.50/kWh while travelling on the interstate during inclement weather, as user-buyers may have little choice for electric energy sources, and the user-seller may charge a premium for on-demand power. The user-buyer benefits from a readily accessible energy supply while on the interstate in inclement weather, and the user-seller benefits from a higher premium price.

FIG. 1 illustrates exemplary elements of an on-demand power service. The service may be implemented using a central system 102 and a number of user devices 104a, 104b, 104c, 104n. The user devices may correspond to a variety of devices, such as a smart phone, tablet, or a computing device integrated into a charging station or a vehicle. For example, FIG. 1 illustrates that user device 104a operates in combination with device 105 installed in a vehicle, such as a meter, whereas user device 104b is integrated into a vehicle, user device 104c is independent of a specific vehicle, and user device 104n is integrated into a hub or charging station. When installed in a vehicle, a user device may be removable.

The central system 102 may optionally access other systems or services, including a system 110 that supports financial payments and transactions, as well as other systems and services 112. The other systems may provide information that may be relevant to setting an energy price, such as weather information, energy pricing information, and energy demand information. The central system may be connected to or a part of a head-end system operated by a resource provider, or may be separate from a head-end system.

The central system, the user devices, and the meter may be implemented using hardware and software and may include a processing device that executes instructions stored on a computer-readable medium.

Examples of various aspects and implementations of an on-demand power service are provided below.

Electric Vehicle to Electric Vehicle Charging

In one example of the present disclosure user-sellers provide on-demand power to user-buyers using a software application. In such a system, both user-buyers and user-sellers can create an account in the application providing access to the on-demand power system. The accounts may including banking, credit, financial institution, or other payment information so that funds can be moved to and/or from the accounts of the respective users. As used herein, a "user" refers to and/or includes buyers of electrical power, potential buyers of electrical power, sellers of electrical power, and potential sellers of electrical power. A user can log onto their respective account and indicate that they are capable of providing on-demand power at a given time, and/or indicate that they are looking to receive on-demand power at a given time. When a user-buyer requests on-demand power via the application, a graphical map may be populated with available areas and/or available user-sellers within a particular geographic region. In some examples, the locations of the users are automatically identified, such as by using a navigational system provided as part of, and/or communicatively coupled to the on-demand power system. Additionally and/or alternatively, the users may enter their location into the application using their device.

In some example implementations, the location of the user-seller and/or the user-buyer may correspond with a future location, and the user-seller and user-buyer may agree to meet at the future location. For instance, a user-buyer may drive their electric or hybrid vehicle to their workplace, and plan to stop at a grocery store during the evening commute home. The user-buyer may request the location for on-demand power service to correspond with the location of the grocery store, such that the electric vehicle of the user-buyer may charge while the user-buyer is in the grocery store.

Once the locations of both the user-buyer and the user-seller are determined, a graphical map may be generated that illustrates the location of each of the user-sellers available to provide on-demand power service to the user-buyer. Once the user-buyer accesses the application, the user-buyer may be prompted to specify additional parameters including how much power they need, how quickly they need it (e.g., how long it will take for the charge to be obtained on their electric vehicle), and when they need it (e.g., a time of day when the user-seller and user-buyer may meet to effectuate the transfer). The graphical map may include real-time pricing information. For instance, each user-seller may establish their own price per kWh to be provided to user-buyers at differing periods of time during the day.

The graphical map may display additional parameters for each such user-seller or provide an option to obtain additional parameters for the sellers. Parameters for a respective user-seller may include profile information such as a username, a user ranking, type of vehicle type of meter or power supply, among others. Once the graphical map is generated, the user-buyer has the ability to request an energy transaction and lock in prices for a defined period of time, such as for 15 minutes for example.

In some example implementations, a user-buyer may include parameters in the request for on-demand power that specify a type of power supply, a type of user-seller to engage with, a rate of power requested, and/or a rating of a user-seller to engage with. As another illustration, the user-buyer may specify that they would like to charge their vehicle while in transit. A coupling mechanism that enables the vehicle of the user-buyer and the vehicle of the user-seller to connect while on a roadway may be used, and user-sellers may charge a premium for such services. The user-seller and/or the user-buyer may specify that they are capable of transferring or receiving power while in transit on a roadway (e.g., that their vehicle is equipped with proper coupling mechanisms to allow for in-transit vehicle charging) when they create their account or when they initiate a transaction.

As another illustration, the user-buyer may specify a quality ranking of the user-seller based on previous transactions. For example user-sellers and user-buyers may rate one another after each transaction, and an overall rating score may be assigned to the particular user-seller or user-buyer, representing an overall rating of previous transactions for the particular user. When requesting on-demand power service, a user-buyer may specify that they would like to purchase on-demand power from user-sellers with a particular rating. In yet another example, the user-buyer may specify a type of power source that supplied the power to the user-seller. For instance, a user-buyer may specify that they would like to purchase on-demand power from a user-seller that has charged their vehicle using a renewable power source, such as solar power versus an electric charging station that may generate power using fossil fuel. Once the price and quantity of power to be provided by the user-seller is agreed upon, the user-seller and user-buyer may establish a meeting location and time for the transaction.

As described above, the pricing model may be dictated by each individual user-seller, and may be based on availability of electricity. For instance, a user-seller may establish a higher pricing scheme when the user-seller has limited power remaining on their own electric or hybrid vehicle. The time of day may also impact such pricing schemes. For example, each user-seller can program their account to offer a certain price/kWh at particular times of day, on specific days, and/or during specific events. For example, the user-seller can configure its account to allow a certain price at a certain time of day during the weekdays. As another example, the user-seller can configure its account to allow a certain price on weekend nights. In yet another example, the user-seller can configure its account to allow a certain price when sporting events, conferences, parades, and/or other social events are occurring within a particular geographic range of the user-seller. Yet further, the user-seller can configure its account to consider information from a weather monitoring system, and allow a certain price when the weather monitoring system indicates that inclement weather is imminent and/or in progress.

In some examples, the on-demand power service may implement machine learning to suggest to the user-seller a pricing scheme for power at particular periods of time. For instance, the system can monitor real-time energy usage at public utilities, and/or real-time gasoline prices, and real-time energy prices charged by other user-sellers. Based on the real-time data collected, the application can suggest to the user-seller a price to charge for power at a given moment, in order to be competitive with alternative energy sources and/or alternative energy suppliers within a particular geographic area.

The on-demand power service described herein may use a device that includes an electrical meter plugged into and/or integrated into a vehicle of the user. The application can interface with the meter of the user to provide the services described herein. The meter can initiate and terminate charging of the user-buyer vehicle in accordance with the agreed upon transaction between the user-buyer and user-seller. For instance, the meter will enable charging of the user-buyer's vehicle and stop the charging once a threshold amount of power is transferred to the user-buyer vehicle. The amount of power transferred to the user-buyer from the user-seller may be documented within the application for data capture, invoicing, machine learning, and other uses. Each user may include payment information in their account to facilitate payment between the users.

Figure 2:
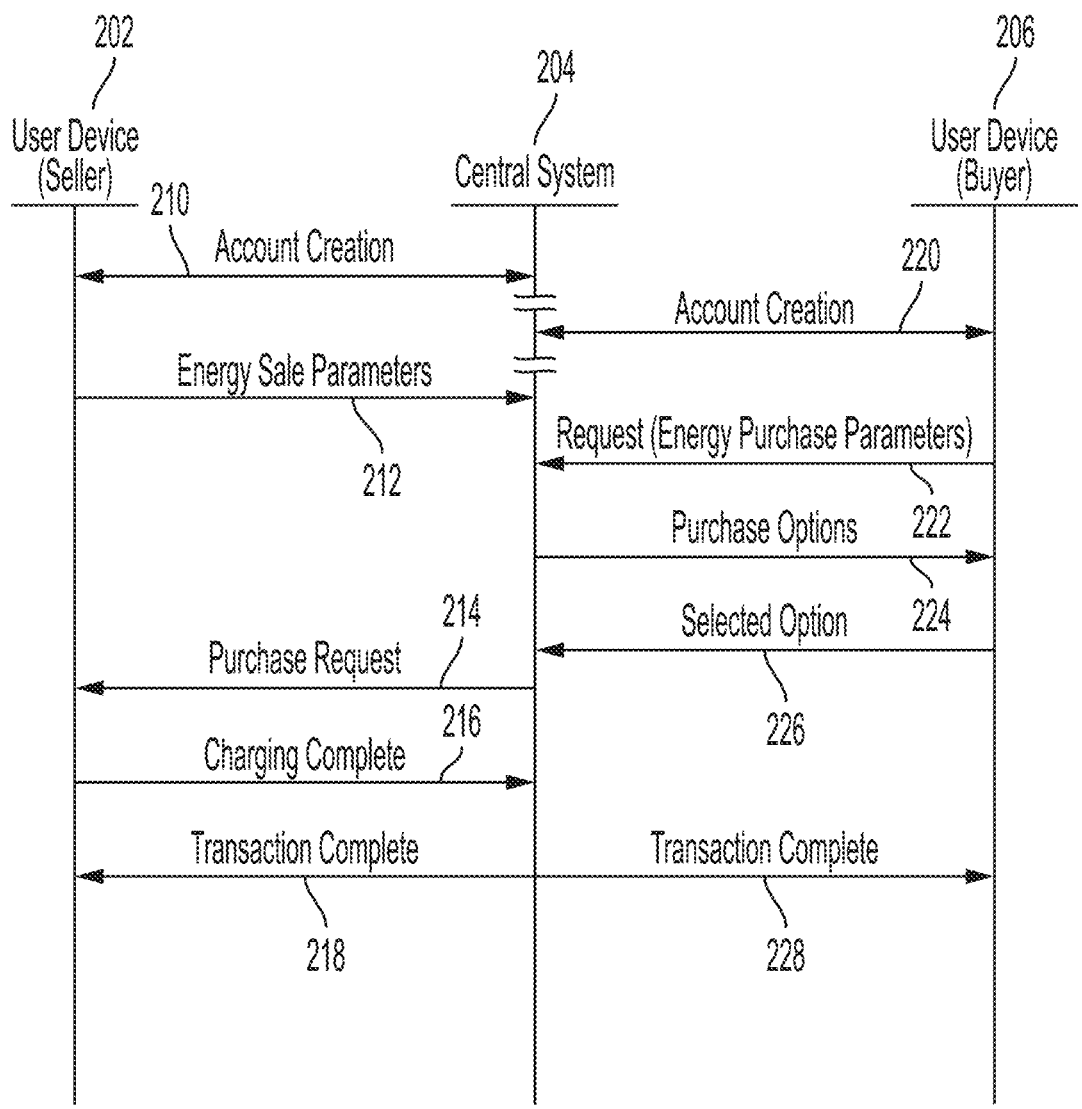
FIG. 2 is a signal flow diagram illustrating exemplary communications between devices in an on-demand power system.

FIG. 2 illustrates exemplary communications within an on-demand power system to support vehicle to vehicle charging. FIG. 2 illustrates a user-seller device 202, a central system 204, and a user-buyer device 206. The seller and the buyer may communicate with each other and with a central system using their respective user devices. Although only one seller and buyer are illustrated in FIG. 2, multiple sellers and buyers may communicate with the system.

Prior to initially using the system, each user communicates 210, 220 with the central system to create an account with the on-demand power system. The accounts may be maintained by the central system. The accounts may include account, credit, or other payment information, in addition to information related to the users, the users' vehicles, transaction parameters, and transaction histories. Transaction parameters include energy sale parameters and energy purchase parameters.

The user-seller may provide energy sale parameters to the system via communication 212. The energy sale parameters may specify a price (e.g. $/kWh). The price may be entered by the user-seller for the current transaction or the price may be determined using a pricing model selected by the user-seller. The pricing model may determine the price based on one or more of the following: the availability of electricity, demand for electricity, electricity prices, time of day, charging location, weather, and seller preferences. The user-seller may configure their account to require that the user-seller approve the price determined by the pricing model prior to providing the price to the user-buyer or set a price manually. Different user-sellers may use different pricing models.

The energy sale parameters may also include one or more areas where the charging may occur. The areas may be based on the user-seller's current location or typical travel patterns, or may be provided by the seller. The user-seller may specify an area and a time period, such as an area around the seller's workplace during the work day. In some implementations, the user-seller can configure its device or its account to automatically adjust one or more of the energy sale parameters. Although FIG. 2 illustrates one energy sale parameter communication from the user-seller's device, the user-seller's device may transmit multiple energy sale parameter communications to the central system.

The user-buyer sends a request 222 to purchase energy that includes energy purchase parameters to the central system. The energy purchase parameters may include one or more of a price, a charging location or area, a time period, a charging rate, or the source of the energy (e.g. renewable source, such as solar array). The central system may identify user-sellers that satisfy one or more of the energy purchase parameters as potential sellers. The central system sends purchase options 224 to the user-buyer that provide information about the potential sellers. In one example, the purchase options are presented via a geographical map displayed on the user-buyer's device and include real time prices. The geographical map may include areas where each potential seller is willing to provide the requested energy and the price to be charged by each seller at each location.

The user-buyer may select one of the options and communicate the selection to the central system via communication 226. Once the central system receives the selected option, it sends a purchase request communication 214 to the seller's user device. In some implementations, there may be additional communications beyond those shown in FIG. 2, such as an acknowledgment or acceptance of the purchase request by the user-seller or a confirmation of the purchase option selected by the user-buyer.

The user-buyer and user-seller may coordinate the details of charging event. The coordination may be via additional communications via the central system (not shown) or via direct communications between the users. For example, the buyer and seller may confirm the specific time and location for the charging event. Alternatively, the purchase request communication may provide the specific time and location for the charging event.

Instead of accepting one of the purchase options, the user-buyer may select one of the user-sellers and then further negotiate the energy sale parameters. If the user-buyer selects one of the user-sellers and then further negotiates the energy sale parameters, then additional communications between the buyer and seller and the central system occur.

During the charging event the seller's electric vehicle directly charges the buyer's electric vehicle. No connection to a public or private electric grid is required. The charging event normally terminates once the agreed upon amount of electrical power is transferred. The seller's vehicle includes or is connected to a metering device that measures the amount of electrical power transferred and other data about the transfer, such as power quality and electrical data. The metering device also controls the transfer of electrical power by initiating and terminating the transfer.

Once the charging is complete, the seller's user device provides a charging complete communication 216 to the central system. The charging complete communication may provide information about the amount of charge provided to the buyer's vehicle or may provide a value of the charge provided to the buyer's vehicle. The metering device may provide data included in the charging complete communication. The central system may record information about the transaction and facilitate payment from the user-buyer to the user-seller in response to receiving the charging complete communication. The central system may provide a transaction complete communication to the user-seller's device 218 and a transaction complete communication to the user-buyer's device 228. These communications provide a summary of the transaction and may solicit feedback from the users.

Additional and alternative communications are possible. For example, in some implementations, the central system may forward the request from the user-buyer to the user-sellers and the sellers may determine if they can accommodate the request. The user-sellers that can accommodate the request respond to the central system. The central system compiles information about the user-sellers that responded to the request and sends the information to the user-buyer in the purchase option communication.

Electric Vehicle Charging Using the Public Grid

In some examples, the electric vehicle of a user-seller may be coupled to a public grid, and utilized to provide power to user-buyers. A user-seller may utilize an application, as described herein, to advertise to user-buyers that the user-seller can provide on-demand power. The user-seller and the user-buyer may connect to the public grid to facilitate the exchange of power. For example, the user-seller and the user-buyer may connect to a dedicated hub or charging station, that is connected to the public grid. The application on the user-seller's device may have the ability to monitor the charge stored in the user-seller's vehicle and to disconnect the vehicle from the public grid when a predetermined percentage of battery life remains. For instance, a user-seller may need to reserve some battery life, such as 10% of battery life to get home. The system may recognize when the 10% battery life threshold is met, send a signal to the meter in the user-seller's vehicle instructing the meter to disconnect and/or terminate the transfer of energy from the user-seller vehicle. If the user-seller's vehicle is disconnected prior to providing the amount of energy requested by the user-buyer, then the application may provide the user-buyer with information about additional options, including the availability of additional user-sellers.

Alternatively, the user-buyer may connect to a designated charging station located at their residence to charge their vehicle and the user-seller may connect to a dedicated hub or charging station. The user-seller may offer special pricing to the user-buyer based on bulk purchases.

In some examples, the application allows public utilities to purchase electricity from individual user-sellers during peak demand at dedicated hubs which reside through the cities and roadways. The purchased electricity may be used for any purpose, including charging of a user-buyer's vehicle.

Electric Vehicle to Private Grid

In some examples the electric vehicle of a user-seller may be coupled to a private grid, and utilized to provide power to user-buyers. For example, private companies may act as a user-seller and provide on-demand power to user-buyers using the application, through a private grid. Only user-buyers that have access to the private grid may access the prices and offerings of the private grid. The company (e.g. user-seller) may have dedicated charging stations that are included in the private grid. Some dedicated charging stations may be mobile, such as may be transported within a vehicle. Some dedicated charging stations may be stationary, such as may be installed at a gas station, grocery store, shopping center, or other place of business. For example, a company such as ABC Company may purchase electricity for a set price from a public utility company. Customers that shop at ABC Company may access a private grid offered by ABC Company while shopping at ABC Company, and purchase on-demand power from the ABC Company private grid.

Negotiation Between Users

As described herein, the on-demand power service may allow for the user-seller and user-buyer to negotiate prices, rates, or other parameters for on-demand power. For example, a user-buyer may specify an amount of power needed, a time frame when the power is needed, and/or how quickly they would like to charge (e.g., a charge rate). Once the user-buyer accesses the application, the user-buyer may be prompted to specify different parameters including how much power they need, how quickly then need it (e.g., how long it will take for the charge to be obtained on their electric vehicle), and when they need it (e.g., a time of day when the user-seller and user-buyer may meet to effectuate the transfer). The user-buyer may specify other parameters in the request for on-demand power, such as a power source, and a user-seller rating, among other example parameters.

Once the user-buyer specifies the parameters in the request for the on-demand power, the user-seller can propose a price for providing the requested power, within the requested parameters. The user-seller may provide additional incentives as part of the pricing scheme offered. For instance, the user-seller may provide a discount to the user-buyer if the user-buyer charged their electric or hybrid vehicle at one location as opposed to another location. The user-seller may also provide incentives for repeat user-buyers, and/or "bulk" purchasing, whereby the user-buyer agrees to purchase a threshold amount of power from the user-seller within a given period of time. As part of the application, the user-seller may propose a pricing scheme for the requested on-demand power service, and the user-buyer may decline the proposed price, counter offer (e.g., negotiate), or accept the proposed price. For instance, the application may provide a graphical display which allows the user-buyer to decline the proposed price, counter offer (e.g., negotiate), or accept the proposed price.

Similarly, the application may provide a display which allows user-buyers to identify other user-sellers that are available to provide power within the particular geographic area and/or within the specified timeframe. The graphical display can display all of the available user-sellers, and can provide additional information about the user-sellers. For instance, each user-seller and user-buyer can be rated based on previous transactions. Sellers can be rated based on the accuracy of their offers (e.g., were they able to provide the amount of power requested), the ease with which the transaction was executed, and/or other factors. Similarly, buyers can be rated based on business interactions with sellers, ease of payment, and/or other factors.

In some examples, the user-seller and the user-buyer may negotiate additional parameters of the on-demand power service. For instance, the user-seller may offer to supply and/or loan a vehicle to the user-buyer for a period of time while the user-buyer's vehicle charges. In such a manner, the user-buyer may drop off their vehicle at a predetermined location (e.g., negotiated in advance with the user-seller), pick up a charged vehicle provided by the user-seller for a period of time, and return the "loaned" vehicle at a specified time and/or location.

Portable Charging Station

In accordance with examples of the present disclosure, the on-demand power service may be implemented using portable charging stations. Wireless transformer applications may be used to transfer electricity from an electric and/or hybrid vehicle of a user-seller to an electric and/or hybrid vehicle of a user-buyer. The portable charging station may also have dedicated external cables that enable coupling of the charging station to the user-buyer vehicle. Approved charging stations will also act as a transfer bridge.

Each portable charging station may include a meter which monitors the amount of power transferred between the user-seller and the user-buyer, and which is communicatively coupled to the application through which the transaction was facilitated. The meter may automatically disconnect once the agreed upon amount of power transfer is achieved and/or responsive to input from the user-seller and/or user-buyer.

In one example, the portable charging station is associated with an electric vehicle. A solar array may be mounted to the electric vehicle and may be used to charge a storage system, such as a battery. The portable charging station also includes a charging interface that connects the portable charging station to a user-buyer's vehicle. The charging interface may include a wireless transformer or cables. A meter may measure the power provided to the user-buyer's vehicle and a disconnect switch may enable and terminate charging of the user-seller's vehicle. The portable charging station further includes a communication interface to communicate with other devices, such as a user-seller's device, a user-buyer's device, and/or a central system. In one implementation, the portable charging station communicates with the central system or the user-buyer's device via the user-seller's device. In other examples, the portable charging station may communicate directly with the other devices.

Figure 3:
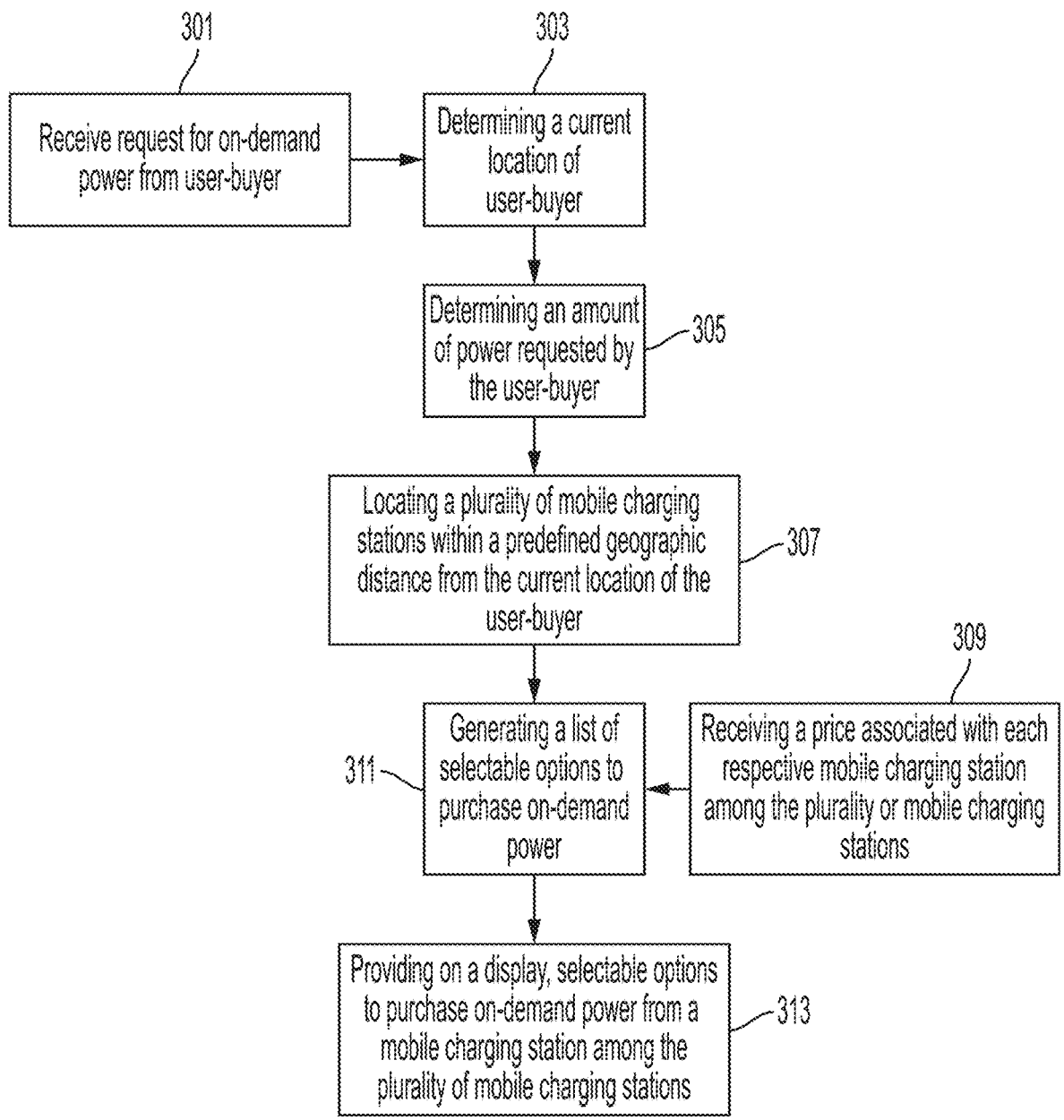
FIG. 3 is a flow diagram illustrating an exemplary method for providing on-demand power.

FIG. 3 illustrates an example method of providing on-demand power service, in accordance with the present disclosure. At 301, the method includes receiving a request for on-demand power from a user-buyer. The user-buyer may access the application using a portable computing device such as a smart phone, tablet computer, or computing device in their vehicle, among other examples, to request on-demand power. Once the user-buyer accesses the application, the user-buyer may be prompted to specify different parameters including how much power they need, how quickly they need it (e.g., how long it will take for the charge to be obtained on their electric vehicle), and when they need it (e.g., a time of day when the user-seller and user-buyer may meet to effectuate the transfer).

At 303, the method includes determining a current location of the user-buyer. The current location of the user-buyer may be determined automatically, such as by using a navigational system provided as part of, and/or communicatively coupled to the on-demand power system. Additionally and/or alternatively, the user may enter their location into the application on their device. In either scenario, the location of the user requesting energy may be determined, and user-sellers that are available to provide on-demand power to the requesting user-buyer may be identified. The location of the user-sellers may also be determined. For instance, the location of the user-seller may be automatically identified using a navigational system as described above, and/or the location of the user-seller may be determined by manual input by the user-seller.

In some examples, the location of the user-seller and/or the user-buyer may correspond with a future location, and the user-seller and user-buyer may agree to meet at the future location. For instance, a user-buyer may drive their electric or hybrid vehicle to their workplace, and plan to stop at a grocery store during the evening commute home. The user-buyer may request the location for on-demand power service to correspond with the location of the grocery store, such that the electric or hybrid vehicle of the user-buyer may charge while the user-buyer is in the grocery store.

At 305, the method includes determining an amount of power requested by the user-buyer. The amount of power requested may be determined from the request received from the user-buyer, and specified by the various parameters included in the request. At 307, the method includes locating a plurality of mobile charging stations within a predefined geographic distance from the current location of the user-buyer. Each respective mobile charging station may be associated with a different respective user-seller of on-demand power. The application implementing the on-demand power system may have a default geographic region within which it will search for mobile charging stations (e.g., user-sellers). For instance, the application may automatically search a geographic region of 10 square miles for user-sellers available at the time of receipt of the request for on-demand power. In some examples, the application implementing the on-demand power system may search a geographic region of a size specified in the request. For example, the user-buyer may specify that they would like to search in a 15 square mile area, within a particular zip code, within a particular city, or within a highway exit for available user-sellers.

At 309, the method includes receiving from each respective mobile charging station (e.g., user-seller) identified within the geographic region, a price and/or prices for the requested charge. For instance, responsive to receiving a request for on-demand power from a user-buyer, each user-seller may respond to the request with a proposed price, taking into consideration the specified parameters of the request (e.g., amount of power, when it is needed, rate of charge, etc.). In some examples, the pricing response from the user-seller is automatic, as may be configured by the application facilitating the on-demand power service. For instance, each user-seller may specify a set unit price for on-demand power for particular days, particular times of day, etc. In other examples, the pricing response from the user-seller is customized for the particular request received, and generated by the user-seller. For instance, the user-seller may be presented with the specific parameters of the on-demand power request, and be given an option to provide a customized quote for providing power to the user-buyer according to the request.

At 311, the method includes generating a list of selectable options to purchase on-demand power. The list of selectable options includes a list of user-sellers that are within the specified (or default) geographic region, that are able to provide the power requested by the user-buyer, and within the parameters specified by the user-buyer. The list of selectable options may specify a total price for the charge, and/or a unit price per kWh, as well as other pricing factors. For example, the list of selectable options may include incentives offered by the user-seller, such as bulk pricing, discounts offered to encourage the user-buyer to attend a particular charging station, etc. The list of selectable options may also include an identification of each respective user-seller available. The identification of the user-sellers may include information such as a name or username of the user-seller, and a rating for the user-seller, among other information.

At 313, the method includes providing on a display, the selectable options to purchase on-demand power from the mobile charging stations (e.g., the user-sellers). For instance, the application may provide to the user-buyer, a graphical user interface (GUI) including the list of selectable options, and may also include an identification of each respective user-seller available. The GUI may provide an option to purchase the on-demand power, an option to communicate with particular user-sellers such as by voice call, chat, text message, etc., and an option to view account information (e.g., financial information, purchase history, configurations, etc.). Moreover, the GUI may provide options for users to assume the role of a user-buyer, as well as a user-seller. For instance, each user of the application may sell on-demand power and act as a user-seller and consume on-demand power and act as a user-buyer. As such, the GUI presented to each user may include a prompt that allows the individual user to log in as a user-buyer or a user-seller.

In some implementations, a non-transitory machine readable storage medium stores instructions executable by a processor. The non-transitory machine readable medium may store instructions which, when executed by the processor, cause the processor to determine a current location of a meter communicatively coupled to an on-demand power supply service, the meter associated with a user-buyer of electrical power in the on-demand power supply service, and determine an amount of power requested by the user-buyer, as described herein. The non-transitory machine readable medium may store instructions which, when executed by the processor, cause the processor to locate a plurality of mobile charging stations also communicatively coupled to the on-demand power supply service and within a predefined geographic distance from the current location of the user-buyer, each of the plurality of mobile charging stations associated with a different respective user-seller of electrical power in the on-demand power supply service. The non-transitory machine readable medium may store instructions which, when executed by the processor, cause the processor to receive a price associated with each respective mobile charging station among the plurality of mobile charging stations, and displays to the user-buyer and on a graphical user interface, selectable options to purchase on-demand power from a mobile charging station among the plurality of mobile charging stations. In some examples, the non-transitory machine readable medium may store instructions which, when executed by the processor, cause the processor to provide an application, including a graphical display which allows the user-buyer to decline the proposed price, counter offer (e.g., negotiate), or accept the proposed price received from a user-seller. Additionally and/or alternatively, the graphical display can display all of the available user-sellers in a particular geographic region, and can provide additional information about the user-sellers in that geographic region. For instance, the graphical display can include a username for each user-seller, a price for the requested power if provided by each user-seller, and parameters associated with each user-seller (such as, for example, average user rating, type of energy supply, type of vehicle, etc.).

General Considerations

Numerous specific details are set forth herein to provide a thorough understanding of the claimed subject matter. However, those skilled in the art will understand that the claimed subject matter may be practiced without these specific details.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more examples of the present subject matter. Any suitable programming, scripting, or other type of language or combinations of languages may be used to implement the teachings contained herein in software to be used in programming or configuring a computing device.

Examples of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

What is claimed is:

1. A method for charging an electric vehicle, comprising:
   receiving electrical power from a source;
   storing at least a portion of the electrical power in a storage system connected to a first electric vehicle;
   generating parameters for selling a portion of the stored electrical power from the first electric vehicle, wherein the parameters include a price, a location, and information about the source;
   receiving a request from a second electric vehicle to purchase a requested amount of electrical power;
   responding to the request and confirming that electrical power is available from the first electric vehicle;
   providing electrical power to the second electric vehicle directly from the first electric vehicle;
   monitoring an amount of electrical power remaining in the storage system connected to the first electric vehicle while providing the electrical power to the second electric vehicle;
   detecting when the amount of electrical power remaining in the storage system connected to the first electric vehicle reaches a predetermined percentage;
   based on the amount of electrical power remaining in the storage system connected to the first electric vehicle reaching the predetermined percentage, disconnecting the first electric vehicle from the second electric vehicle;
   when an actual amount of electrical power provided to the second electric vehicle from the first electric vehicle is less than the requested amount of electrical power, providing information to the second electric vehicle about additional charging options;
   calculating a value of the amount of electrical power provided to the second electric vehicle from the first electric vehicle; and
   charging an account associated with the second electric vehicle with the value of the amount of electrical power.

2. The method of claim 1, wherein the source is an electrical grid or a solar array attached to the first electric vehicle.

3. The method of claim 1, wherein generating parameters for selling a portion of the stored electrical power includes collecting data regarding a weather condition, energy prices, and energy demand, and using the collected data to generate the price.

4. The method of claim 1, wherein generating parameters for selling a portion of the stored electrical power includes determining the price based on a time period specified in the request.

5. The method of claim 1, wherein after receiving a request from the second electric vehicle to purchase a first amount of electrical power, determining whether the request requires a first type of source; and when the request requires a first type of source, using the information about the source to determine whether the source is associated with the first type of source.

6. The method of claim 1, wherein the request includes a location and providing a first amount of electrical power to the second electric vehicle directly from the first electric vehicle occurs proximate to the location.

7. The method of claim 1, wherein providing electrical power to the second electric vehicle directly from the first electric vehicle includes using a meter to measure the amount of electrical power as it is provided, and calculating a value of the amount of electrical power includes using a measurement of the meter to calculate the value.

8. A portable charging station associated with a first electric vehicle, comprising:
   a solar array mounted to the first electric vehicle;
   a storage system connected to the solar array;
   a charging interface configured for connecting the portable charging station directly to a second electric vehicle;
   a meter configured for measuring electrical power provided by the portable charging station to the second electric vehicle; and
   a communication interface configured for communications with a system that includes a first user device associated with the first electric vehicle, a second user device associated with the second electric vehicle, and a central system, wherein the communications with the system include:
      a request from the second user device requesting a purchase of a first amount of electrical power from the portable charging station;
      a response from the first user device confirming that electrical power is available from the portable charging station;
      an instruction to monitor an amount of electrical power remaining in the storage system while the portable charging station provides electrical power to the second electric vehicle;
      an instruction to disconnect the portable charging station prior to providing the first amount of electrical power based on detecting that the amount of electrical power remaining in the storage system has reached a predetermined threshold;
      a report from the portable charging station to the central system indicating an actual amount of electrical power provided to the second electric vehicle from the portable charging station or a value of the electrical power provided to the second electric vehicle from the portable charging station, wherein the report is based on measurements by the meter; and
      information received by the second user device about additional charging options when the actual amount of electrical power provided to the second electric vehicle from the portable charging station is less than the first amount of electrical power.

9. The portable charging station of claim 8, wherein the charging interface includes a wireless transformer or cables.

10. The portable charging station of claim 8, wherein the charging interface includes a disconnect switch and the communications with the system include an instruction to operate the disconnect switch to disconnect the portable charging station from the second electric vehicle once the first amount of electrical power is provided.

11. A method for requesting power for charging an electric vehicle using a computing device, the method comprising:
   determining a current location of the computing device;

determining an amount of power requested by a user of the computing device for charging the electric vehicle;

locating a plurality of mobile charging stations within a predefined geographic distance from the current location of the computing device;

receiving a price for the amount of power from each of the plurality of mobile charging stations;

providing on a display of the computing device, selectable options to purchase power, wherein each selectable option is associated with one mobile charging station of the plurality of mobile charging stations;

receiving a selection of one of the selectable options associated with a first mobile charging station; and receiving power from the first mobile charging station directly to the electric vehicle;

ceasing to receive power from the first mobile charging station prior to receiving the amount of power, wherein the first mobile charging station is disconnected when a battery of the first mobile charging station reaches a predetermined threshold of battery life; and receiving information about additional charging options, including additional mobile charging stations after ceasing to receive power from the first mobile charging station.

12. The method of claim 11, wherein the user requests a power charge rate in addition to the amount of power, and locating a plurality of mobile charging stations includes identifying mobile charging stations capable of providing the requested power charge rate and the requested amount of power, and wherein the selectable options include mobile charging stations that can provide both the requested power charge rate and the requested amount of power.

13. The method of claim 11, further comprising:

monitoring an actual amount of power provided from the first mobile charging station to the electric vehicle;

after the electric vehicle receives the actual amount of power from the first mobile charging station, collecting feedback information from the user; and displaying the feedback information in a subsequent selectable option associated with the first mobile charging station.

14. The method of claim 11, further comprising:

receiving an indication of a power source associated with each respective mobile charging station; and determining a type of power source requested by the user of the computing device, wherein the type of power source is a renewable power source, wherein determining the selectable options, includes identifying mobile charging stations associated with the renewable power source.

15. The method of claim 11, further comprising:

determining pricing criteria for the amount of power requested by the user;

receiving location information from each of the plurality of mobile charging stations; and determining the selectable options based on the price for the amount of power received from the plurality of mobile charging stations, the pricing criteria, and the received location information.

\* \* \* \* \*